Oct. 14, 1969  A. O. PAYNE  3,472,378
REMOTE ADJUSTMENT FOR COMBINE SIEVE
Filed Jan. 22, 1968  3 Sheets-Sheet 1

INVENTOR.
AMOS O. PAYNE.
BY
SETTLE, BATCHELDER & OLTMAN.
ATT'YS.

Oct. 14, 1969   A. O. PAYNE   3,472,378
REMOTE ADJUSTMENT FOR COMBINE SIEVE
Filed Jan. 22, 1968   3 Sheets-Sheet 2

INVENTOR.
AMOS O. PAYNE.
BY
SETTLE, BATCHELDER & OLTMAN.
ATT'YS.

Oct. 14, 1969   A. O. PAYNE   3,472,378
REMOTE ADJUSTMENT FOR COMBINE SIEVE
Filed Jan. 22, 1968   3 Sheets-Sheet 3

INVENTOR.
AMOS O. PAYNE.
BY
SETTLE, BATCHELDER & OLTMAN
ATT'YS.

United States Patent Office 3,472,378
Patented Oct. 14, 1969

3,472,378
REMOTE ADJUSTMENT FOR COMBINE SIEVE
Amos O. Payne, Eldridge, Iowa, assignor to J. I. Case Company, Racine, Wis., a corporation of Wisconsin
Filed Jan. 22, 1968, Ser. No. 699,431
Int. Cl. B07b 1/00
U.S. Cl. 209—394      11 Claims

ABSTRACT OF THE DISCLOSURE

A harvesting machine having a grain separator which includes sieves incorporating an adjusting mechanism capable of varying the size of the openings in the sieves. The adjusting mechanism includes a flexible cable and sheath assembly with a manual member located remote from the sieve assembly and connected to the cable which in turn is connected to the adjusting mechanism of the sieve thereby allowing adjustment of the sieve opening during operation of the harvesting machine.

BACKGROUND OF THE INVENTION

The present invention relates generally to grain separators and more particularly to adjusting means for varying the size of the openings in sieves forming part of the grain separators.

Present day harvesting machines, such as combines, have for years included a separating mechanism which separates the grain kernels from the remaining harvested materials. Conventionally, at least two sieve assemblies are provided in a single moving frame which is reciprocated upon the fixed frame of the harvesting machine. The entire assembly is conventionally referred to as the cleaning shoe and one of the sieves is generally referred to as the chaffer sieve while the remaining sieve is referred to as the cleaning sieve. Furthermore, in more recent machines, it has been customary to divide the chaffer sieve into two sections with the second section commonly being referred to as the chaffer extension.

In the harvesting machines of the above type, the cleaning shoe generally incorporates some mechanism for adjusting the size of the opening of the various sieves to thereby insure a clean finally harvested grain. This has become a necessity due to the variety of crop conditions as well as the requirement for adjustment of the harvesting machine to suit various different crops.

The recent emphasis on harvesting machines of the above type, which are generally of the self-propelled type, has been placed upon increasing the efficiency of the harvesting operation with a minimum amount of effort required by the operator. Thus, in present day commercial structures of the above type, many of the adjustments which must necessarily be repeatedly made during the operation of the harvesting machine are remotely controlled so as to be within easy reach of the operator during the operation of the machine. Thus, for example, the harvesting machine generally includes an adjusting mechanism for varying the speed of the threshing cylinder as well as the spacing between the threshing cylinder and the concave while the operator is at the operator's station and the vehicle is being driven in the field.

The adjusting mechanisms for varying the size of the openings have conventionally been incorporated in the moving frame structure of the cleaning shoe assembly. Thus, for example, the adjusting mechanism normally includes a lever carried on the moving portion of the frame and extending rearwardly through the rear exit of the machine with an innerconnection between the lever and the slats forming the sieve. In this manner adjustment can be made by actuating the lever from the ground behind the machine.

Of course, such an adjusting mechanism requires that the entire machine be shut down and the operator dismount to provide the necessary adjustment. This is not only an annoying operation to the operator but it is also very time consuming.

During a normal harvesting day, it is necessary to make such an adjustment several times as for example in the early morning hours when the crop is still moist, during the major portion of the day when the crop is dry and in the latter part of the day when the crop is again slightly moist and tough to separate. Furthermore, in many harvesting operations it is necessary to make adjustments while moving from one area of the field to another. This of course is necessitated by the varying crop conditions which are normally encountered during any harvest.

SUMMARY OF THE INVENTION

Thus, it would be highly advantageous to provide a mechanism for adjusting the size of the openings in the sieves of the cleaning shoe assembly while the machine is in operation. The present invention provides such an adjusting mechanism.

Furthermore, in the preferred embodiment of the invention, the controls for the adjusting mechanism are disposed within the confines of the operator's station, so that the operator can readily make the necessary adjustment while the machine is traveling along in the field.

Of course, conventional harvesting machines now generally return the grain heads and other material discarded by the cleaning sieve backed through the threshing cylinder along a path which is adjacent to the operator's station. Thus, the operator can at all times check the returned harvested material, commonly referred to as tailings, to determine whether the sieves are properly adjusted. Likewise, the harvested grain is collected in a hopper adjacent the operator's station so that the operator can at all times check the cleanliness of the harvested grain to determine the efficiency of operation of the cleaning shoe assembly.

Thus, the primary object of the present invention is to provide an improved adjusting mechanism which is capable of being actuated while the machine is in operation to thereby vary the size of the openings in the grain separators.

Another object is to provide an improved remotely controlled adjusting mechanism which provides a flexible connection between the manual control member and the adjusting mechanism located on the grain separator.

A further object of the invention is to provide individually controlled manually operated members for each of the sieves forming the crop separator with the manual controls being located at the operator's station of the machine.

Other objects of this invention will appear in the following description and appended claims forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
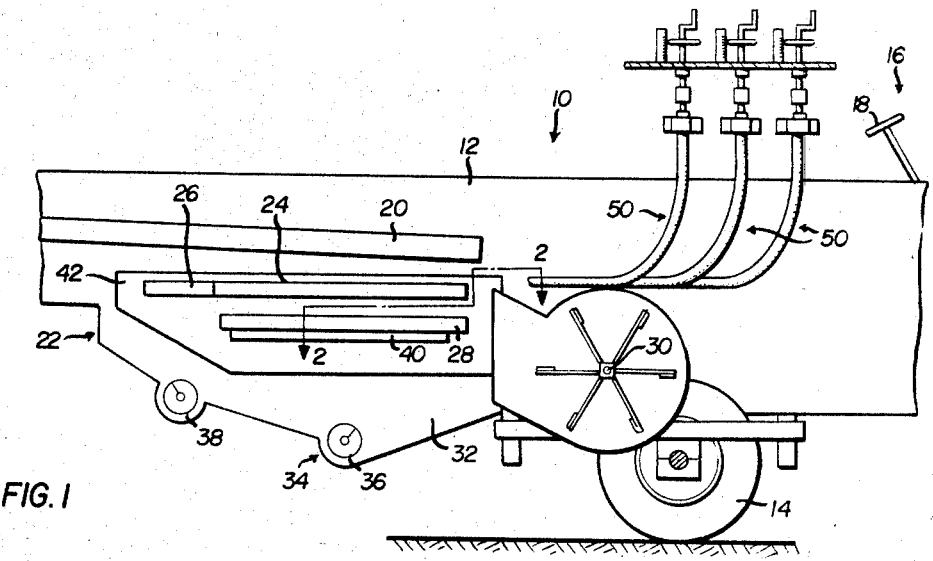
FIGURE 1 shows a fragmentary side elevation of a harvesting machine having the control mechanism of the present invention incorporated therein.

FIGURE 1 of the drawings show a conventional harvesting machine 10 having the adjusting means of the present invention incorporated therein. The harvesting machine includes a housing 12 supported on wheels 14 (only one being shown) and an operator's station 16 having a steering wheel 18 disposed therein. Many of the details of the harvesting machine have been eliminated since they do not form any part of the present invention.

The harvesting machine 10 further includes a straw rack 20 which separates the harvested grain from the remaining harvested material and deposits such grain, as well as chaff and light straw, upon the cleaning shoe assembly generally designated at 22. The cleaning shoe assembly 22 is reciprocated fore and aft of the housing or frame 12 by suitable means (not shown) and conventionally includes a chaffer sieve 24, a chaffer sieve extension 26 and a cleaning sieve 28.

During normal operation of the cleaning shoe assembly, a blower 30 is in open communication with a portion 32 of the frame or housing 12 which has the cleaning shoe assembly movably mounted therein. Thus, the blower 30 provides a continuous flow of air upwardly through the sieves 24, 26 and 28 to thereby separate the lighter chaff and straw from the remaining grain received by the respective sieves. The clean grain passing through the cleaning sieve 28 is collected in a trough 34 and transferred through an auger 36 to the conventional grain hopper while the unthreshed heads of harvested material are delivered to a second auger 38 to be returned to the threshing cylinder (not shown).

While not necessary to the practice of this invention, the sieves 24, 26 and 28 are preferably constructed in accordance with the teachings of my copending application for "Sieve Design for Combines," Ser. No. 699,610, filed of even date herewith and assigned to the assignee of the present application.

Figure 4:
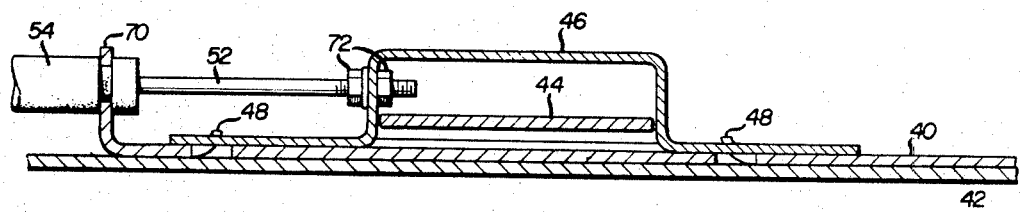
FIGURE 4 is a horizontal fragmentary sectional view showing the connection of the adjusting mechanism at the grain separator.

In the above mentioned copending application, each sieve is supported on a railing structure 40 carried by the side frames 42 defining the moving frame of the cleaning shoe assembly 22. The adjusting means incorporated within the sieve of the above mentioned type, includes a shifter plate 44 (FIGURE 4) extending below the side frame portions of the sieve assembly which is received in the U-shape portion of a sliding bracket 46 carried by ears 48 formed on the railing structure or side rails 40. Thus, shifting the bracket 46 longitudinally of the frame will adjust the size of the openings in the sieve slats connected thereto.

According to the present invention, remote control means are provided for shifting the bracket 46 while the harvesting machine is in operation. While the location of the manual control for the respective adjusting means can be located anywhere on the machine, in the preferred embodiment disclosed herein, the remote control adjusting means is located in the operator's station of the harvesting machine so that the adjustments can readily be made while the operator is seated at the normal position and the machine is in operation. Preferably three independently actuated adjusting means are provided for the chaffer sieve, chaffer sieve extension and cleaning sieve. Since all three are identical in construction only one will be described in detail.

The adjusting means of the present invention includes a flexible cable assembly 50 having a sheath or sleeve surrounding a cable or core with the cable being movable relative to the sleeve. A conventional type of flexible cable assembly of this type is commonly termed a Bowden wire.

Figure 2:
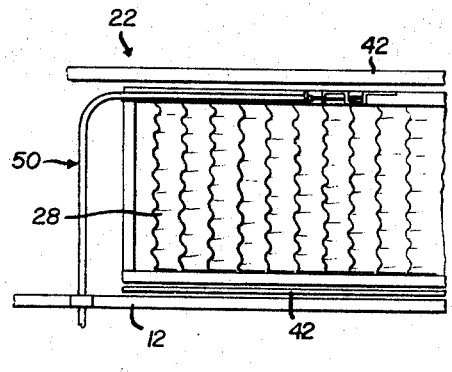
FIGURE 2 is a fragmentary plan view of the crop separator and the present control mechanism taken generally along lines 2—2 of FIGURE 1.

According to one aspect of the invention, the flexible cable 50 is connected to the sieve assemblies on the side located remotely from the operator's side of the harvesting machine. Thus, as shown in FIGURE 2, the cable assembly 50 extends substantially horizontally transversely across the entire width of the cleaning shoe assembly at the forward end thereof and then is connected to the shifting member forming part of the sieve assembly 28, in a manner to be presently described. By having cable assembly extend across the width of the combine and swung in a large arc, the rapid motion of the cleaning shoe and sieves will not change the louver settings of the respective sieves. The reciprocating motion of the cleaning shoe assembly will be absorbed within the portion of the cable assembly 50 disposed between the housing 12 and the cleaning shoe assembly 22.

Figure 3:
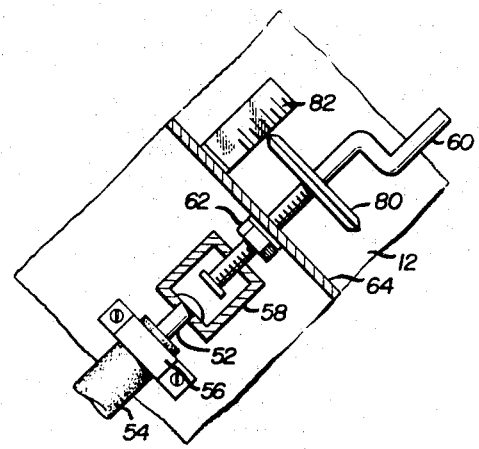
FIGURE 3 is an enlarged fragmentary view of the manual control mechanism forming part of the adjusting means shown in FIGURE 1.

In the embodiment illustrated in FIGURES 1 through 4, the remote control adjusting means includes a core or cable 52 and a sleeve or sheath 54 defining the flexible assembly 50. As shown in FIGURE 3, one of the sheath assembly 50. As shown in FIGURE 3, one end of the sheath 54 defining the flexible assembly 50. As shown in FIGURE 3, one end of the sheath 54 is fixedly secured by a clamp 56 to the combine housing 12 at a point adjacent the operator's station of the vehicle. The adjacent end of the core 52 is connected through a flexible coupling 58 to a crank 60 threadedly received on a nut 62 carried by a bracket 64 formed on the housing 12.

The opposite end of the flexible sleeve 54 is fixedly secured to the movable frame portion of the cleaning shoe. In the illustrated embodiment, this connection is defined by an ear formed on the rail 40 so that this end of the sleeve 54 moves with the moving frame defined by the side plates 42 and the railings 40.

As more clearly disclosed in my above mentioned copending application, the railing 40 supports the sieve assembly 28 which has a shifter plate 44 extending below the railing and received in the bracket 46 defining part of the shifting mechanism of the sieve assemblies. The core or cable 52 of the assembly 50 is fixedly secured by a pair of locked nuts 72 to the bracket 46.

Thus, rotation of the crank 60 in either direction will shift the position of the crank on the threaded nut 62 thus moving the core 52 axially within the sleeve 54 to thereby shift the bracket 46 to in turn vary the size of the sieve openings in the sieve assembly 24.

Preferably, indicating means are provided for showing the size of the opening at the operator's station of the vehicle. In the illustrated embodiment, the indicating means includes a pointer 80 carried by the crank 60 with an indicator plate 82 having suitable indicia thereon fixedly secured to the housing of the combine. Thus, it is readily apparent that the exact setting of the openings in the sieve assemblies can readily be checked by the operator while he is in the operator's station.

Figure 5:
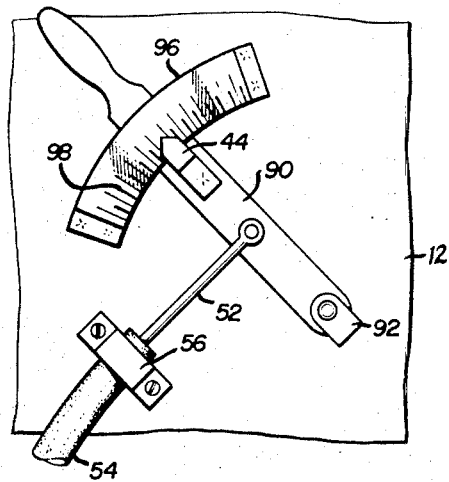
FIGURE 5 is a view similar to FIGURE 3 showing a slightly modified form of manual control.

A slightly modified embodiment of the invention is disclosed in FIGURE 5 wherein a lever 90 is pivotally secured to a bracket 92 carried by the combine housing 12. In the embodiment illustrated in FIGURE 5, the core 52 of the cable assembly 50 is pivotally connected to the lever 90 intermediate its ends and a suitable pointer 94 may be fixedly secured on the lever and located adjacent a quadrant 96 having suitable indicia 98 for showing the exact position of the adjustable bracket 46 and thereby showing the size of the openings in the sieve assembly.

Figure 6:
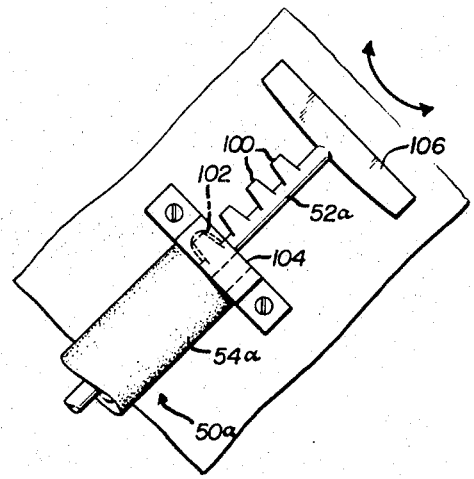
FIGURE 6 is a further modified form of manual control.

A slightly further modified form of manual control means is disclosed in FIGURE 6 and is likewise capable of performing the function of the manual control means disclosed in FIGURES 3 and 5. Thus, the core 52a of the cable assembly 50a has a plurality of integral projections 100 located at spaced points along one portion of the core 52a. The respective projections are adapted to be received in a recess 102 formed on a bracket 104 supporting the sieve 54a on the combine housing. A suitable axially disposed slot in the bracket 104 (not shown) will allow an axial shifting of the core 52a and the projections when the control handle 106 is rotated in either of the directions of the arrows shown in FIGURE 6. Thus, for example, a 90° rotation will place the projections 100 in the axially disposed slot (not shown) of the bracket 104 to thereby allow axial shifting of the core 52. The projections 100 not only will maintain the core locked with respect to the sleeve assembly in any one of a plurality of positions dependent upon the number of projections 100 defined on the core 52a, but will also act as indicia means for showing the relative size of the openings in the sieve assembly 28.

Figure 7:
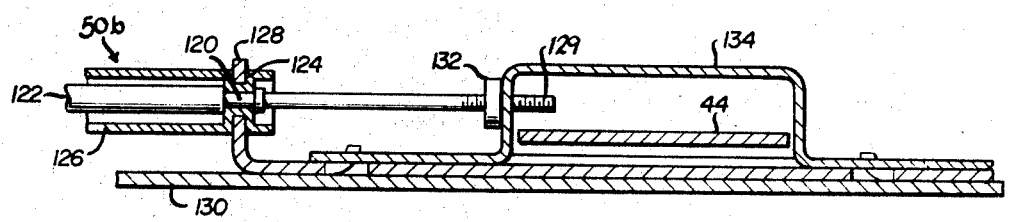
FIGURE 7 is a fragmentary sectional view of a modified form of adjusting mechanism showing the details of the connection between the remotely controlled member and the movable adjusting member on the grain separator.
Figure 8:
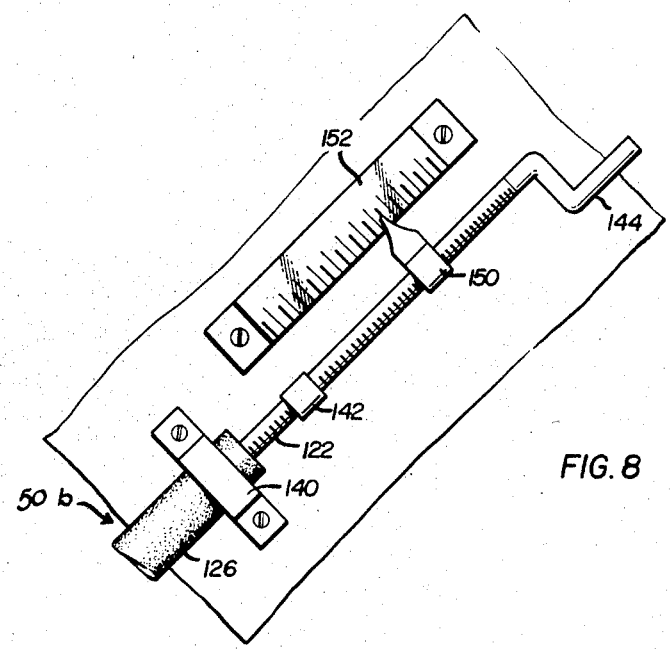
FIGURE 8 is a fragmentary view similar to FIGURE 3 showing a modified form of control mechanism incorporated in the remote control adjusting means shown in FIGURE 7.

A slightly further modification of the remote control adjusting means is shown in FIGURES 7 and 8. In the embodiment illustrated in these two figures, means are provided for limiting the relative movement of the sleeve and the core to rotational movement. By way of illustration, this may be accomplished by providing a reduced portion 120 adjacent one end of the core 122 which is rotatably received in a slightly reduced portion 124 formed on the sleeve 126. The reduced portion 124 of the sleeve 126 may likewise be received in an opening in a bracket or ear 128 defined on the railing 130 similar to the railing 40. The free end of the core 122 is threadedly received in a nut 132 fixedly secured to the bracket 134 which is identical to the bracket 46.

The opposite end of the sleeve or sheath 126 forming part of cable assembly 50b is fixedly secured by a bracket 140 to the vehicle housing while the core 122 is secured through a fixed coupling 142 to a crank 144. Thus, rotation of the crank in either direction will displace the threaded portion 129 of the core 122 within the nut 132 to thereby shift the bracket 134 as well as the shifter plate 44.

If desired, suitable indicia means can again be provided to show the relative size of the openings at any given adjusted position of the remote control mechanism. Thus, for example, a threaded nut 150 is received on the crank 144 and is slidably supported on indicia means 152 carried by the combine housing with suitable indicia formed thereon. Thus, rotation of the crank 144 in either direction will shift the nut 150 axially of the threaded portion of the crank to thereby clearly show the relative position and size of the sieve openings.

Figure 9:
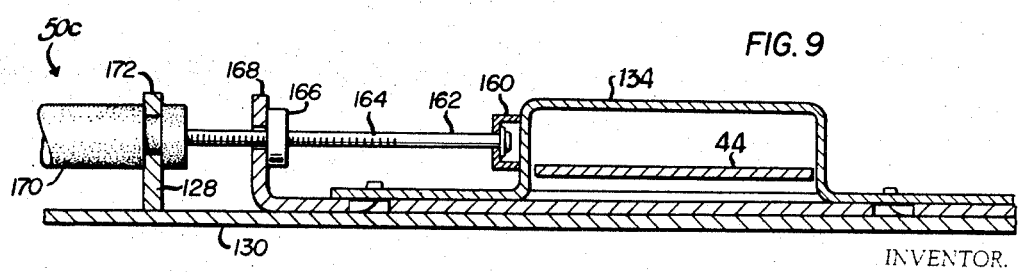
FIGURE 9 shows a further modified form of remotely controlled adjusting mechanism.

A still further slightly modified form of the invention is disclosed in FIGURE 9 which is in many respects similar to that disclosed in FIGURES 7 and 8. The manual control means for the embodiment illustarted in FIGURE 9 may be identical to that disclosed in FIGURE 8. However, the connection between the core and the adjustable bracket 134 includes a fixed coupling 160 carried by the bracket 132 and rotatably receiving the free end of the core 162. The core 162 is again threaded adjacent its free end as at 164, the threaded portion being received in a nut 166 fixedly secured to an ear or lug 168 formed on the railing 130 which again is similar to the railing disclosed in the embodiment of FIGURES 7 and 8. The free end of the sheath 170 defining the cable assembly 50c is secured to an ear 172 depending from the rail 130. Of course, it can readily be appreciated that the operation of the embodiment shown in FIGURE 9 is substantially identical to that disclosed in FIGURES 7 and 8. Thus, rotation of the crank 144 or similar equivalent manual operating means will shift the threaded portion 164 axially of the threaded nut 166 to thereby shift the bracket 134 longitudinally of the railing 130 which will also shift the shifter bar 44 to vary the size of the sieve openings.

The present invention therefore provides a simple and efficient manner of remotely controlling the adjustment of the sieve openings of a cleaning shoe assembly so that all of adjustment can be made from the operator's station of the machine or vehicle.

While several exemplary embodiments of the invention have been described in detail, it will be apparent to those skilled in the art that the disclosed embodiments may be considered exemplary rather than limiting, and the true scope of the invention is that defined in the following claims:

I claim:

1. In a harvesting machine having a grain separator including a sieve mounted on a moving frame carried by the machine with said sieve having adjusting means including a movable member for varying the size of the sieve openings, the improvement of said adjusting means comprising first and second relatively movable flexible elements, connecting means for securing the opposite ends of said first element respectively to said machine and to said moving frame, manual means remote from said sieve and connected to one end of said second element for producing relative movement between said elements, and means securing the opposite end of said second element to said movable member whereby relative movement between said elements will vary the size of the sieve openings, said adjusting means including means maintaining said sieve openings at a predetermined adjusted position.

2. A harvesting machine as defined in claim 1, wherein said moving frame is reciprocated along a path defining a plane within said machine, the further improvement of said first and second elements comprising flexible coaxial elements, said elements having portions extending transversely of said path adjacent one end of said moving frame whereby the reciprocation of said moving frame is accommodated within said portions.

3. A harvesting machine as defined in claim 2, wherein said grain separator includes a plurality of sieves mounted on said moving frame, including the further improvement of each of said sieves having one of said adjusting means operatively associated therewith whereby the size of the openings of each of said sieves may be independently varied.

4. A harvesting machine as defined in claim 1 wherein said machine includes an operator's station remote from said moving frame, the further improvement of said manual means located in said operator's station whereby the adjustment of said sieve openings may be made during operation of said machine.

5. A harvesting machine as defined in claim 1, in which said first and second elements are a coaxial sheath and cable assembly with said manual means including a crank threaded in an opening on said machine, means operatively connecting said crank to said cable whereby rotation of said crank will shift said cable axially of said sheath to vary the size of the sieve openings, and indicia means interposed between said crank and said machine to indicate the size of said sieve openings.

6. A harvesting machine as defined in claim 1, in which said first and second elements are a coaxial sheath and cable assembly axially movable in said sheath, said manual means comprising a lever secured to said cable for axially moving said cable in said sheath to vary the size of said sieve openings.

7. A harvesting machine as defined in claim 1, in which said first and second elements comprise a flexible sheath and cable assembly operatively interconnected for relative rotational movement only and in which said means connecting said cable to said movable member is a threaded connection whereby actuation of said manual means will rotate said cable to shift said movable member.

8. In a grain separator having a sieve mounted in a moving frame carried by a fixed frame and adjusting means including a movable member on said sieve for varying the size of the sieve openings, the improvement of said adjusting means comprising a flexible core and sleeve assembly, said sleeve having one end attached to said fixed frame and the opposite end attached to said moving frame, connecting means operatively connecting said core to said movable member and manual means connected to said core remote from said sieve whereby actuation of said manual means will adjust the sieve openings.

9. In a grain separator as defined in claim 8, in which said manual means comprises a lever secured to said core and said connecting means comprises a fixed connection between said core and said movable member whereby actuation of said lever will shift said core axially of said sieve to vary the size of the sieve openings.

10. A grain separator as defined in claim 8, in which said core further includes a threaded connection with one of said fixed and movable frames whereby actuation of said manual means will shift said core axially of said sleeve to shift said movable member.

11. A grain separator as defined in claim 8, further including means interposed between said core and sleeve allowing only rotational movement between the sleeve and core and said connecting means shifting said movable member axially of said core in response to rotation of said core in said sleeve.

References Cited

UNITED STATES PATENTS

| | | | |
|---|---|---|---|
| 698,258 | 4/1902 | Closz | 209—394 |
| 1,462,804 | 7/1923 | Evans | 209—374 |
| 2,195,400 | 4/1940 | Arens | 74—501 |
| 2,253,296 | 8/1941 | Holtzman | 209—394 |
| 2,531,740 | 11/1950 | Orscheln | 74—501 |
| 2,670,845 | 3/1954 | Busack et al. | 209—312 X |
| 2,879,890 | 3/1959 | Romera | 209—394 |
| 3,021,009 | 2/1962 | Scott | 209—394 |
| 3,146,631 | 9/1964 | Banzhaf. | |

TIM R. MILES, Primary Examiner

U.S. Cl. X.R.

74—501